United States Patent
Ueda et al.

(10) Patent No.: US 9,061,683 B2
(45) Date of Patent: Jun. 23, 2015

(54) TRAVELING MODE SWITCHING CONTROLLER OF HYBRID ELECTRIC VEHICLE

(71) Applicant: MITSUBISHI JIDOSHA KOGYO KABUSHIKI KAISHA, Tokyo (JP)

(72) Inventors: Katsunori Ueda, Okazaki (JP); Sumio Tanaka, Okazaki (JP); Shigetoshi Hirano, Toyoake (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/136,134

(22) Filed: Dec. 20, 2013

(65) Prior Publication Data

US 2014/0180515 A1 Jun. 26, 2014

(30) Foreign Application Priority Data

Dec. 21, 2012 (JP) ................................. 2012-279312

(51) Int. Cl.
*B60W 20/00* (2006.01)
*B60W 10/06* (2006.01)
(Continued)

(52) U.S. Cl.
CPC .............. *B60W 20/20* (2013.01); *B60W 10/06* (2013.01); *B60W 10/08* (2013.01); *Y10S 903/93* (2013.01); *B60K 6/442* (2013.01); *B60K 6/448* (2013.01); *B60K 6/52* (2013.01); *B60W 2050/0026* (2013.01); *B60W 2050/0042* (2013.01); *B60W 2050/0056* (2013.01); *B60W 2510/244* (2013.01); *B60W 2540/10* (2013.01); *B60W 2540/106* (2013.01); *B60W 2540/103* (2013.01);
(Continued)

(58) Field of Classification Search
USPC ............. 701/22, 36; 180/65.1, 65.21, 65.265, 180/65.275, 65.28, 65.285; 307/9.1, 10.1, 307/10.7; 903/902, 903, 907
See application file for complete search history.

(56) References Cited

U.S. PATENT DOCUMENTS

| | | | | |
|---|---|---|---|---|
| 5,568,023 | A * | 10/1996 | Grayer et al. | 318/139 |
| 6,137,250 | A | 10/2000 | Hirano et al. | |
| 8,013,394 | B2 * | 9/2011 | Chinthakindi et al. | 257/358 |
| 2002/0029624 | A1 | 3/2002 | Gassner et al. | |

(Continued)

FOREIGN PATENT DOCUMENTS

| | | |
|---|---|---|
| DE | 10 2004 024 374 A1 | 12/2005 |
| FR | 2 812 588 A1 | 2/2002 |
| JP | 2011-156985 A | 8/2011 |

OTHER PUBLICATIONS

European Search Report issued Apr. 17, 2014 for European Application No. EP 13 19 8271.

*Primary Examiner* — Yonel Beaulieu
(74) *Attorney, Agent, or Firm* — Birch, Stewart, Kolasch & Birch, LLP

(57) ABSTRACT

A traveling mode switching controller of a hybrid electric vehicle has a state-of-charge detection unit; a driver request output detection unit; a correction unit; and a switching control unit for controlling a switch from a first traveling mode to a second traveling mode when a vehicle request output exceeds an output threshold value. In the first traveling mode, an engine is deactivated and the drive motor is activated. In the second traveling mode, drive wheels are actuated by means of driving power of the engine, or a generator connected to the engine is activated to generate electric power to activate the drive motor to actuate the drive wheels. The switching control unit sets the output threshold value low as the state of charge decreases, thereby changing conditions for switching the first traveling mode to the second traveling mode.

2 Claims, 3 Drawing Sheets

(51) Int. Cl.
   *B60W 10/08*   (2006.01)
   *B60K 6/442*   (2007.10)
   *B60K 6/448*   (2007.10)
   *B60K 6/52*    (2007.10)
   *B60W 50/00*   (2006.01)

(52) U.S. Cl.
   CPC .......... *Y02T 10/6286* (2013.01); *Y02T 10/6234* (2013.01); *Y02T 10/6265* (2013.01); *Y02T 10/7258* (2013.01); *Y02T 10/6243* (2013.01)

(56) References Cited

U.S. PATENT DOCUMENTS

| | | | |
|---|---|---|---|
| 2007/0220883 A1* | 9/2007 | Harada et al. | 60/597 |
| 2008/0228334 A1* | 9/2008 | Hashimoto | 701/22 |
| 2012/0109438 A1* | 5/2012 | Akebono et al. | 701/22 |
| 2012/0203406 A1* | 8/2012 | Akebono et al. | 701/22 |
| 2012/0207620 A1* | 8/2012 | Dalum et al. | 417/44.1 |
| 2012/0209463 A1 | 8/2012 | Gibbs et al. | |
| 2013/0297123 A1* | 11/2013 | Gibson et al. | 701/22 |
| 2014/0136039 A1* | 5/2014 | Tanishima et al. | 701/22 |

* cited by examiner

TRAVELING MODE SWITCHING CONTROLLER OF HYBRID ELECTRIC VEHICLE

BACKGROUND

The invention relates to a technique for controlling switching of a traveling mode of a hybrid electric vehicle.

Of recently-developed hybrid electric vehicles, some vehicles are known as being able to switch among an EV mode in which the vehicle travels by means of electric motors and through use of electric power fed from a drive battery without activating an engine, a series mode in which the vehicle travels by means of the electric motors while generating electric power by causing the engine to actuate a generator, and a parallel mode in which the vehicle travels by means of both the engine and the electric motors.

Patent Document 1 discloses a hybrid electric vehicle capable of switching among the EV mode, the series mode, and the parallel mode. Additionally disclosed is the technology of automatically selectively performing switching to the EV mode at a low vehicle speed and switching to the parallel mode at a high vehicle speed when a drive battery exhibits a high state of charge and switching to the series mode at the low vehicle speed and switching to the parallel mode at the high vehicle speed when the drive battery exhibits a low state of charge.

[Patent Document 1] JP-A-2011-156985

SUMMARY

When a decrease occurs in the state of charge of the drive battery while; for instance, the vehicle that switches the traveling mode as described above is traveling at a low vehicle speed, the traveling mode is switched to the series mode.

As above, the hybrid electric vehicle that switches between the EV mode (a first traveling mode) and another mode (a second traveling mode) which involves activation of the engine generally performs control operation for automatically switching the traveling mode from the EV mode to the other mode so as to prevent the state of charge of the drive battery falls below an allowable range.

Incidentally, since the drive battery is mounted on the vehicle, the capacity of the drive battery has a limitation. In addition, electric power output from the drive battery greatly varies according to an output of a drive motor (an electric motor). Accordingly, when there is performed control for switching the EV mode to the other mode in accordance with the state of charge of the drive battery as mentioned above, it is necessary to switch the EV mode to the other mode in good time in order to surely prevent the state of charge from falling below the allowable range. However, switching the EV mode to the other mode involving activation of the engine in good time causes deterioration of fuel consumption, and hence maintaining the EV mode as long as possible is desirable.

The invention has been conceived in order to resolve the problem and aims at providing a traveling mode switching controller of a hybrid electric vehicle that can improve fuel consumption by appropriately switching a traveling mode.

In order to accomplish the objective, a traveling mode switching controller of a hybrid electric vehicle, comprising:
a state-of-charge detection unit for detecting a state of charge of a drive battery;
a driver request output detection unit for detecting a driver request output from an operation amount of an accelerator pedal of a vehicle;
a correction unit for calculating a vehicle request output by making a correction to the driver request output; and
a switching control unit that, when the vehicle request output exceeds an output threshold value based on the state of charge of the drive battery, controls a switching from a first traveling mode in which an engine is deactivated and a drive motor is activated by means of an electric power supplied from the drive battery to actuate drive wheels to a second traveling mode in which the engine is actuated and the drive wheels are actuated by means of driving power of the engine or in which a generator connected to the engine is actuated and the drive motor is actuated to actuate the drive wheels, wherein
the switching control unit sets the output threshold value low as the state of charge decreases, thereby changing conditions for switching the first traveling mode to the second traveling mode.

The traveling mode switching controller of the hybrid vehicle may be configured such that the correction unit performs a damping process for decreasing an amount of change in the driver request output to thus calculate the vehicle request output.

The traveling mode switching controller of the hybrid vehicle may be configured such that the correction unit sets low a time constant, which is a rate of decrease of the amount of change in the driver request output to be employed in the damping processing, as the state of charge decreases.

The traveling mode switching controller of the hybrid vehicle may be configured such that: the output threshold value is increased in a first rate of increase as the state of charge increases, in a state where the state of charge of the drive battery is equal to or lower than a predetermined state of charge, and the output threshold value is increased in a second rate of increase, which is larger than the first rate of increase, as the state of charge increases, in a state where the state of charge of the drive battery is higher than the predetermined state of charge.

DETAILED DESCRIPTION OF EXEMPLIFIED EMBODIMENTS

An embodiment of the invention is hereunder described by reference to the drawings.

Figure 1:
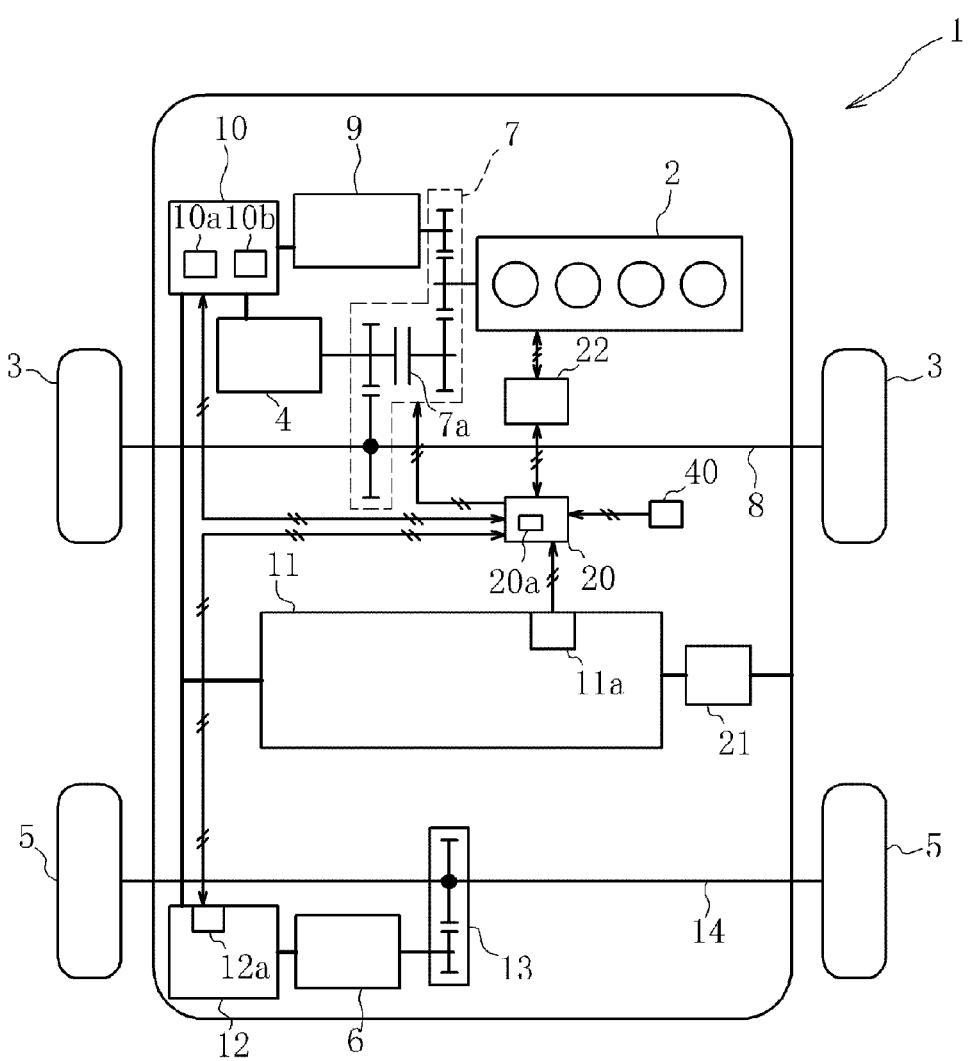
FIG. 1 is a diagrammatic layout chart of a plug-in hybrid electric vehicle of an embodiment of the invention.

FIG. 1 is a diagrammatic layout chart of a plug-in hybrid electric vehicle (hereinafter called a "vehicle 1") of an embodiment of the invention.

The vehicle 1 of the embodiment is a four-wheel-drive vehicle that can travel by actuating front wheels 3 by means of an output from an engine 2 and that is outfitted with a front electric motor 4 (a drive motor) for actuating the front wheels 3 and a rear electric motor 6 (a drive motor) for actuating rear wheels 5.

The engine 2 can actuate a drive shaft 8 of the front wheels 3 by way of a speed reducer 7 and also generate electricity by activating a generator 9 by way of the speed reducer 7.

Supplied with high voltage electricity from a drive battery 11 mounted in the vehicle 1 and the generator 9 by way of a front inverter 10, the front motor 4 is activated to thus actuate the drive shaft 8 of the front wheels 3 by way of the speed reducer 7. The speed reducer 7 has a built-in clutch 7a that can switch between connection and disconnection of power transmission between an output shaft of the engine 2 and the drive shaft 8 of the front wheels 3.

Supplied with high voltage electric power from the drive battery 11 and the generator 9 by way of the rear inverter 12, the rear motor 6 is activated to thus rotate a drive shaft 14 of rear wheels 5 by way of a speed reducer 13.

Electric power generated by the generator 9 can be used for supplying electric power to the front motor 4 and the rear motor 6 as well as for charging the drive battery 11 by way of the front inverter 10.

The drive battery 11 is made up of a secondary battery, like a lithium ion battery, and includes an unillustrated battery module assembled by bundling a plurality of battery cells. In addition, the drive battery 11 is outfitted with a battery monitoring unit 11a (a state-of-charge detection unit) for monitoring a temperature and a state of charge (hereinafter abbreviated as "SOC") of the battery module.

The front inverter 10 has a front motor control unit 10a and a generator control unit 10. The front motor control unit 10a controls an output of the front motor 4 in accordance with a control signal from a hybrid control unit 20. The hybrid control unit 20 includes a switching control unit and a driver request output detection unit. The generator control unit 10b has a function of controlling an amount of electricity generated by the generator 9 in accordance with a control signal from the hybrid control unit 20.

The rear inverter 12 has a rear motor control unit 12a. The rear motor control unit 12a has a function of controlling an output of the rear motor 6 in accordance with a control signal from the hybrid control unit 20.

The vehicle 1 is also outfitted with a battery charger 21 that charges the drive battery 11 with an external power supply.

The hybrid control unit 20 is a controller for comprehensively controlling the vehicle 1 and includes an input/output device, a memory device, a central arithmetic processing unit (CPU), a timer, and others. The memory device may be ROM, RAM, nonvolatile RAM, or the like.

A battery monitoring unit 11a of the drive battery 11, a front motor control unit 10a and the generator control unit 10b of the front inverter 10, the rear motor control unit 12a of the rear inverter 12, an engine control unit 22 for controlling operation of the engine 2, and an angle-of-accelerator-pedal sensor 40 for detecting an angle of the accelerator pedal are connected to an input side of the hybrid control unit 20. The detection and activation information output from these units are input to the hybrid control unit 20.

In the meantime, the front motor control unit 10a and the generator control unit 10b of the front inverter 10, the rear motor control unit 12a of the rear inverter 12, the speed reducer 7 having the clutch 7a, and the engine control unit 22 are connected to an output side of the hybrid control unit 20.

The hybrid control unit 20 computes a vehicle request output P, which is necessary to cause the vehicle to travel, from the various pieces of detection and activation information and transmits control signals to the engine control unit 22, the front motor control unit 10a, the generator control unit 10b, the rear motor control unit 12a, and the speed reducer 7, thereby switching the traveling mode and controlling an output from the engine 4, an output from the front motor 9, and an output from the rear motor 11, and an amount of electric power generated by a generator 9. The traveling mode includes the EV (electric vehicle) mode (the first traveling mode), the series mode (the second traveling mode), and the parallel mode (the second traveling mode).

In the EV mode (the first traveling mode), the engine 2 is deactivated, and the front motor 4 and the rear motor 6 are activated by means of the electric power supplied from the drive battery 11, to cause the vehicle to travel.

In the series mode (the second traveling mode), the clutch 7a of the speed reducer 7 is disconnected, and the engine 2 activates the generator 9. The front motor 4 and the rear motor 6 are activated by use of the electric power generated by the generator 9 and the electric power supplied from the drive battery 11, thereby causing the vehicle to travel. In addition, in the series mode, a rotation speed of the engine 2 is maintained within a range of superior fuel consumption, and the electric power generated by an excessive output is fed to the drive battery 11, thereby recharging the drive battery 11.

In the parallel mode (the second traveling mode), the clutch 7a of the speed reducer 7 is connected to mechanically transmit driving power from the engine 2 by way of the speed reducer 7 and actuate the front wheels 3. In addition, the front motor 4 and the rear motor 6 are activated by the electric power that is generated as a result of the generator 9 being activated by the engine 2 and the electric power fed from the drive batter 11, thereby causing the vehicle to travel.

In a range where the engine 2 exhibits superior efficiency, like a high speed range, the hybrid control unit 20 switches the traveling mode to the parallel mode. In a range except the parallel mode; in other words, middle and low speed ranges, switching takes place between the EV mode and the series mode.

When the SOC of the drive battery 11 falls below an allowable range, the hybrid control unit 20 coercively activates the engine 2 to thereby generate electric power and recharge the drive battery 11. Granted that a lower limit value of the allowable range of the SOC of the drive battery 11 is SOCL, the allowable range is defined as; for instance, SOCL to 100%.

In addition, in the embodiment, switching between the EV mode and the series mode is performed on the basis of the SOC of the drive battery 11 and a request output P that is generated by making a correction to a driver request output that is detected by the driver request output detection unit of the hybrid control unit 20 in accordance with an amount of operation of the accelerator pedal.

Figure 2:
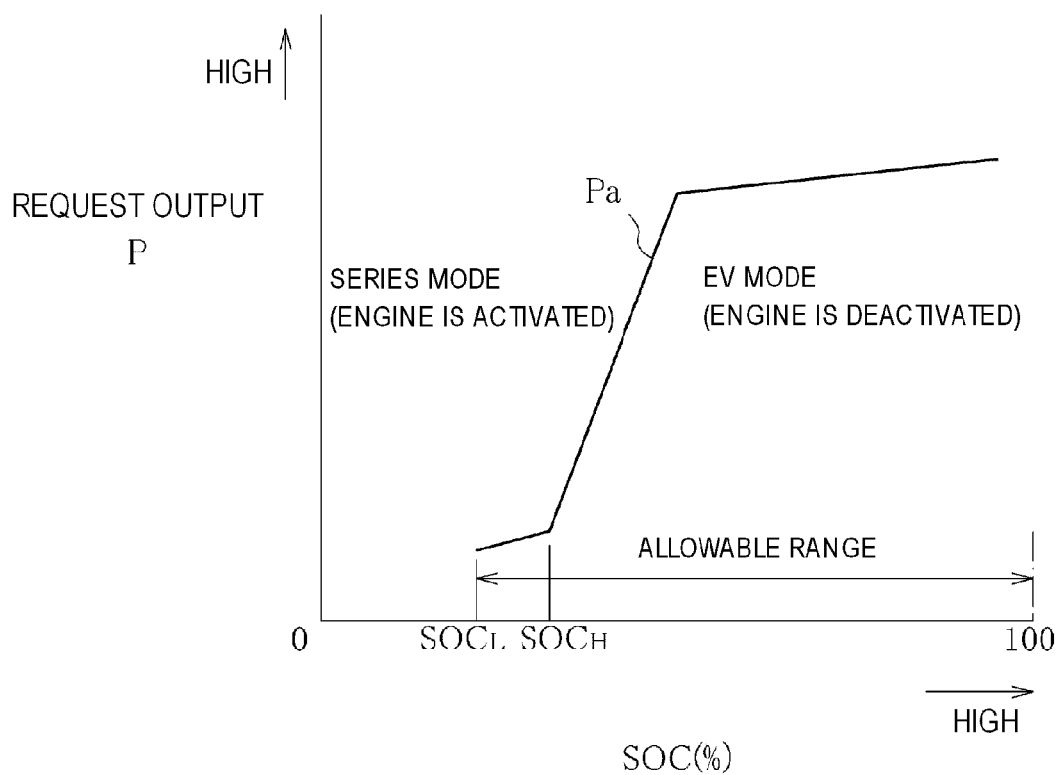
FIG. 2 is a map for determining switching between an EV mode and a series mode of the embodiment.

FIG. 2 is a map for determining switching between the EV mode and the series mode employed in the embodiment.

The hybrid control unit 20 preliminarily stores a switching determination map, such as that shown in FIG. 2, and makes a choice between the EV mode and the series mode within an operation range except a parallel-mode operation range.

The hybrid control unit 20 determines a threshold value Pa (an output threshold value) for a vehicle request output corresponding to the SOC of the drive battery 11 by use of the map shown in FIG. 2. When the vehicle request output P is the threshold value Pa or more, the traveling mode is switched to the series mode by activating the engine 2. In contrast, when the vehicle request output P is less than the threshold value Pa, the traveling mode is switched to the EV mode by deactivating the engine 2.

As shown in FIG. 2, in the embodiment, the threshold value Pa is set a different value from the SOC of the drive battery 11. To be specific, the threshold value Pa is set higher as the SOC increases, whilst the threshold value Pa is set lower as the SOC decreases. Moreover, when the SOC is situated in a low range (from SOCL to SOCH in FIG. 2) within the allowable range, a rate of increase of the threshold value Pa (i.e., a gradient of the threshold value Pa in FIG. 2) relatively to an increase in SOC is set so as to become comparatively smaller rate (a first rate of increase). Further, when the SOC exceeds;

for instance, SOCH, the rate of increase of the threshold value Pa is set so as to become comparatively larger rate (a second rate of increase), so that the traveling mode is made more likely to be set to the EV mode even when the vehicle request output P is high.

Figure 3:
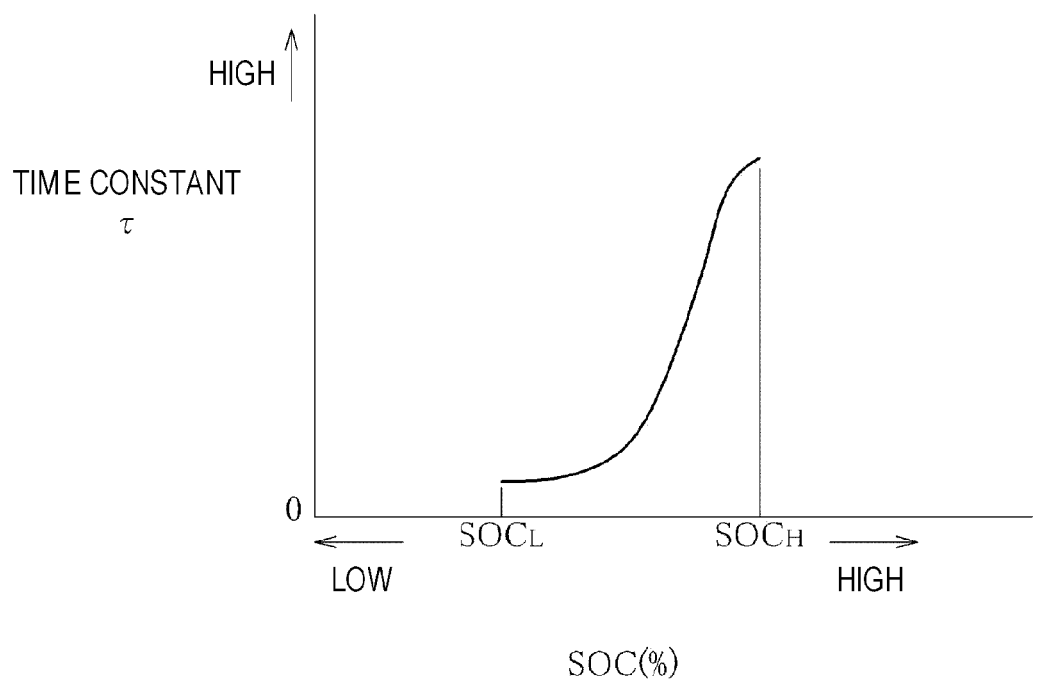
FIG. 3 is a map for setting a time constant of a filter of the embodiment.

FIG. 3 is a map for setting a time constant of the filter 20a of the embodiment.

The hybrid control unit 20 has a filter 20a (a correction unit) for transforming the driver request output to the vehicle request output P by unit of damping. The filter 20a makes a correction so as to dampen an abrupt change (an amount of change) in the driver request output. A determination is rendered as to switching between the EV mode and the series mode by use of the vehicle request output P moderated by the filter 20a. For instance, when the driver request output varies in a vicinity of the threshold value Pa, a change in the vehicle request output P is thereby dampened, so that a frequency of occurrence of mode switching decreases to thus make it possible to prevent the engine from being activated and deactivated over and over again.

Further, the time constant T representing intensity of the damping process by the filter 20a is changed on the basis of the SOC. Specifically, as shown in FIG. 3, when the SOC increases (i.e., the SOC approaches SOCH) in the low range within the allowable range of the SOC, damping process is intensively performed by increasing the time constant T. By contrast, when the SOC decreases (the SOC approaches SOCL), damping is less intensively performed by lowering the time constant T.

In the embodiment, in relation to switching between the EV mode and the series mode, when the vehicle request output P is the threshold value Pa or more, the traveling mode is switched to the series mode by unit of performing control operation as above. When the vehicle request output P is less than the threshold value Pa, the traveling mode is switched to the EV mode. Accordingly, when the drive battery 11 consumes low power, the EV mode is selected to improve fuel consumption. In contrast, when the drive battery 11 consumes high power, the series mode is selected, to enable prevention of occurrence of a fall in SOC of the drive battery 11.

Further, in the embodiment, the threshold value Pa for a determination as to switching between the EV mode and the series mode is changed on the basis of the SOC. When the SOC is high, the threshold value Pa is set high. Even when the vehicle request output P is high, the traveling mode thereby becomes more likely to be set to the EV mode, so that the fuel consumption can be improved. When the SOC is low, the threshold value Pa is set low. Accordingly, the traveling mode becomes more likely to be set to the series move, so that occurrence of a fall in SOC can be inhibited.

Switching between the EV mode and the series mode is carried out on the basis of the vehicle request output P and the SOC as above, whereby switching between the EV mode and the series mode is appropriately performed in response to a change in the vehicle request output P. The number of opportunities for using the EV mode is thereby increased, so that fuel consumption can be improved.

In the embodiment, the filter 20a subjects the driver request output to the damping process in the low SOC range (for instance, SOCL to SOCH) within the allowable range, whereby a change in the vehicle request output P is dampened. The frequency of occurrence of switching between the EV mode and the series mode; in other words, the frequency of occurrence of switching between activation and deactivation of the engine 2, becomes fewer, so that vehicle passengers feel less feeling of discomfort.

Moreover, the time constant T for the damping process to be performed by the filter 20a is changed on the basis of the SOC. When the SOC becomes high (the SOC approaches SOCH), the time constant T is increased to thus perform the damping process intensively. The change in the vehicle request output P, which would occur in response to the drive request output, can be dampened, so that switching to the series mode becomes difficult to take place. Thus, fuel consumption can be further improved. Moreover, the time constant T is set low as the SOC decreases (or approaches SOCL), thereby making the damping process less intensive. Consequently, the traveling mode becomes likely to change from the EV mode to the series mode when changes occur in the driver request output. A fall in SOC of the drive battery 11 can be further dampened, so that SOC can be surely prevented from falling below the allowable range.

Therefore, even when a change occurs in the driver request output, the SOC of the drive battery 11 can be stably maintained in the lower range (SOCL to SOCH) within the allowable range by changing the time constant T of the damping process to the vehicle request output on the basis of the SOC. This makes it possible to surely prevent the SOC from falling below the allowable range and further increase the number of chances to use the EV mode, whereby further improvements in fuel consumption can be expected.

As described above, according to the traveling mode switching controller of the hybrid vehicle of the invention, the vehicle request output is calculated by making a correction to the driver request output detected from the amount of operation of the accelerator pedal. When the vehicle request output exceeds the output threshold value based on the SOC of the drive battery in the course of the vehicle traveling at the first traveling mode, the first traveling mode is switched to the second traveling mode, so that occurrence of a fall in SOC of the drive battery can be inhibited.

In addition, the threshold value for use in determining switching from the first traveling mode to the second traveling mode is set low as the SOC of the drive battery decreases. Accordingly, the traveling mode is made more likely to be switched to the second traveling mode at a low SOC, thereby inhibiting occurrence of a fall in the SOC of the drive battery. In the meantime, the traveling mode is made less likely to be switched to the second traveling mode at a high SOC, thereby inhibiting activation of the engine, so that improvements in fuel consumption can be expected.

Switching between the first traveling mode and the second traveling mode is performed in accordance with the SOC and the vehicle request output based on the driver request output, whereby switching between the first traveling mode and the second traveling mode can be appropriately performed in accordance with a change in the driver request output. Thus, improvements in fuel consumption can be expected by increasing the number of chances to use the first traveling mode.

Moreover, the vehicle request output is calculated by performing the damping process for reducing an amount of change in the driver request output, and hence a change in vehicle request output is inhibited. Accordingly, when changes occur in the vehicle request output in the vicinity of the output threshold value, the frequency of occurrence of switching between the first traveling mode and the second traveling mode; in other words, the frequency of activation and deactivation of the engine, diminishes, so that feeling of discomfort which vehicle passengers would feel can be lessened.

Since the time constant of the damping process of the correction unit is set low as the SOC decreases, the EV mode becomes more likely to be switched to the series mode at a low SOC during occurrence of a change in request output, so that occurrence of a fall in the amount of recharged electricity in the drive battery can be further inhibited. In the meantime, the traveling mode is made less likely to be switched to the series mode at a high SOC, so that an additional improvement in fuel consumption can be expected.

The invention of the present application is not limited to the embodiment. For instance, in relation to the map shown in FIG. 2, the sole requirement is to set the threshold value Pa of the vehicle request output for effecting switching to the series mode as the SOC increases. Alternatively, the threshold value can also be set so as to change consecutively or stepwise. Further, a change can also be made, as necessary, to the map shown in FIG. 3. However, as illustrated in FIG. 3, it is desirable to set the time constant T of the damping process high as the SOC increases.

Further, in the embodiment, the invention is applied to a plug-in hybrid electric vehicle capable of switching among the EV mode, the series mode, and the parallel mode. However, the invention can be widely applied to a hybrid electric vehicle capable of switching, at least, between the EV mode and the series mode or between the EV mode and the parallel mode.

What is claimed is:

1. A traveling mode switching controller, including a processing unit, of a hybrid electric vehicle, comprising:
    a state-of-charge detection unit that detects a state of charge of a drive battery;
    a driver request output detection unit that determines, by the processing unit, a driver request output from an operation amount of an accelerator pedal of a vehicle;
    a correction unit that calculates, by the processing unit, a vehicle request output by making a correction to the driver request output; and
    a switching control unit that, when the vehicle request output exceeds an output threshold value based on the state of charge of the drive battery, controls, by the processing unit, a switching from a first traveling mode in which an engine is deactivated and a drive motor is activated by means of an electric power supplied from the drive battery to actuate drive wheels to a second traveling mode in which the engine is actuated and the drive wheels are actuated by means of driving power of the engine or in which a generator connected to the engine is actuated and the drive motor is actuated to actuate the drive wheels, wherein
    the switching control unit sets, by the processing unit, the output threshold value low as the state of charge decreases, thereby changing conditions for switching the first traveling mode to the second traveling mode,
    the correction unit performs a damping process for decreasing an amount of change in the driver request output to thus calculate the vehicle request output, and
    the correction unit sets low a time constant, which is a rate of decrease of the amount of change in the driver request output to be employed in the damping processing, as the state of charge decreases.

2. The traveling mode switching controller of the hybrid vehicle according to claim 1, wherein
    the output threshold value is increased in a first rate of increase as the state of charge increases, in a state where the state of charge of the drive battery is equal to or lower than a predetermined state of charge, and
    the output threshold value is increased in a second rate of increase, which is larger than the first rate of increase, as the state of charge increases, in a state where the state of charge of the drive battery is higher than the predetermined state of charge.

* * * * *